(12) United States Patent
Konashi

(10) Patent No.: US 10,406,736 B1
(45) Date of Patent: Sep. 10, 2019

(54) METHOD FOR MANUFACTURING SLIDING COMPONENT

(71) Applicant: Alpine Electronics, Inc., Tokyo (JP)

(72) Inventor: Kazuyuki Konashi, Fukushima (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 16/053,066

(22) Filed: Aug. 2, 2018

(51) Int. Cl.
| | |
|---|---|
| *B29C 45/16* | (2006.01) |
| *B29C 45/26* | (2006.01) |
| *B29C 45/00* | (2006.01) |
| *B29K 29/00* | (2006.01) |
| *B29K 69/00* | (2006.01) |

(52) U.S. Cl.
CPC ...... *B29C 45/2628* (2013.01); *B29C 45/0001* (2013.01); *B29C 45/1635* (2013.01); *B29K 2029/14* (2013.01); *B29K 2069/00* (2013.01)

(58) Field of Classification Search
CPC .......... B29C 29/2628; B29C 2045/135; B29C 45/13; B29C 45/0017; B29C 2045/002; B29C 2045/0022; B29C 2045/0024
See application file for complete search history.

(56) References Cited

U.S. PATENT DOCUMENTS

2009/0295011 A1* 12/2009 Smith ................ B29C 44/086
264/101
2009/0321236 A1* 12/2009 McCurdy ............ B29C 45/0017
200/329

FOREIGN PATENT DOCUMENTS

JP           2010-009877 A       1/2010

* cited by examiner

*Primary Examiner* — Robert C Dye
*Assistant Examiner* — Alexander D Booth
(74) *Attorney, Agent, or Firm* — Brinks Gilson & Lione

(57) ABSTRACT

Provided is a method for manufacturing a sliding component including a protruding portion that is provided on the outer surface of a slider body portion of a slider so as to protrude into the inside of a penetrating portion provided in a part of a case body portion (wall portion) of a case. In some implementations, the penetrating portion and the protruding portion are formed in a state where an insert having an insert recess is advanced, and the insert is retreated in a mold to form the sliding component in which the slider is fitted in the case.

3 Claims, 5 Drawing Sheets

METHOD FOR MANUFACTURING SLIDING COMPONENT

BACKGROUND

1. Field of the Invention

The present disclosure relates to a manufacturing method including a step of assembling a sliding component consisting of at least two members in a molding.

2. Description of the Related Art

In a component having a sliding component that includes a case and a slider, such as a push switch, it is important to control the sliding performance to reduce the dimensional error of the two members that comprise the sliding component.

Regarding this point, Japanese Unexamined Patent Application Publication No. 2010-009877 discloses an invention of a method for manufacturing a push switch. The push switches include a slider which has a contact inclined surface, is supported by a tubular case having a restriction inclined surface to reciprocate, advances during a pushing operation, and is automatically returned to a non-operation position by allowing the contact inclined surface of the slider to come in contact with the restriction inclined surface upon retreating. The method comprises: injection-molding a first resin in a first cavity and cooling the first resin to cause solidification to form the tubular case provided with restriction portions including a pair of restriction inclined surfaces having an interval therebetween which increases in a retreat direction; and injection-molding a second resin which has a higher thermal contraction coefficient and a lower melting temperature than those of the first resin in a second cavity for forming the tubular case as a part of a mold, and cooling the second resin to cause solidification, to form the slider provided with the contact portion with a shape similar to and slightly smaller than the shape of the restriction portion in order that they be complementary to each other.

In such a push switch manufacturing method, when the slider is molded by a two-color molding technique in which, after forming the tubular case made of a first resin, a second resin which has a higher thermal contraction coefficient and a lower melting temperature than those of the first resin is injected into a cavity for forming the tubular case as a part of a mold, and is cooled and solidified, the shape of the contact portion of the slider can be formed with high accuracy as a shape similar to and slightly smaller than the shape of the restriction portion of the tubular case in order that they be complementary to each other. Therefore, in the push switch formed by combining the tubular case and the slider, the engagement point between the restriction inclined surface and the contact inclined surface at the time of non-operation do not vary, and the positional deviation and rattling of the slider caused by the error of the molding dimension can be suppressed effectively.

However, in the manufacturing method described in Japanese Unexamined Patent Application Publication No. 2010-009877, since the case (tubular case) and the slider are molded of materials having significantly different thermal contraction coefficients, these two members are manufactured as independent members (separate members). Therefore, after taking out these members from the mold, it is necessary to assemble the two members into a sliding component.

SUMMARY

The present disclosure has been made in view of such circumstances of the conventional art, and one of its objectives is to provide a method for manufacturing a sliding component including at least two members using a two-color molding technique, where a method for manufacturing a sliding component includes a step of assembling these members in a mold.

In one aspect of the present disclosure, a method for manufacturing a sliding component including a case having a hollow portion and a slider, a part of which is located in the hollow portion is provided. An inner surface of a wall portion surrounding the hollow portion of the case and an outer surface of a portion of the slider located in the hollow portion face each other and slidable in a first direction. The wall portion of the case is provided with a penetrating portion penetrating in a second direction different from the first direction. A portion of an outer surface of the slider facing the penetrating portion is provided with a protruding portion protruding into the penetrating portion. The shape of the protruding portion and the shape of the penetrating portion is formed such that sliding of the slider in the first direction with respect to the case is restricted by contact of the protruding portion with the case. The method for manufacturing may include a case molding step of injecting a first resin material into a first cavity of a mold having an insert and cooling and solidifying the first resin material to form the case in the mold. The method may also include a slider molding step of, in a state where the case formed in the case molding step is present in the mold, injecting a second resin material having a higher thermal expansion coefficient than that of the first resin material into a second cavity defined to include the inner surface of the wall portion of the case and cooling and solidifying the second resin material to form the slider separate from the case. The insert is movable forward and backward in a direction corresponding to the second direction, and has a recess corresponding to the protruding portion in a first insert surface located on the advancing side of the insert. In the case molding step, the first resin material is injected to form the penetration portion in a state where the insert is advanced and the first insert surface is not exposed in the first cavity. In the slider molding step, the second resin material is injected in a state where the first insert surface is exposed in the second cavity, and the second resin material is filled in the recess. After completion of the slider molding step, the insert is retreated, and the sliding component in which the slider is fitted in the case is formed in the mold.

As described above, the sliding component may have a structure in which a protruding portion is provided on a member constituting the sliding surface (outer surface) on the slider side so as to be located within the penetrating portion provided in a member (wall portion) constituting the sliding surface (inner surface) on the case side, and, in the manufacturing method, the penetrating portion and the protruding portion are formed as a transferred shape of a common insert. Therefore, by molding the case of the first resin material in a state where the insert is advanced, subsequently molding the slider of the second resin material, and then retreating the insert, the assembly of the case and the slider can be completed in the mold. Therefore, according to the manufacturing method described above, the sliding component can be efficiently manufactured. Further, since further sliding is restricted when the protruding portion in the penetrating portion comes into contact with the case, if only one of the case and the slider constituting the sliding component is held, the coming off of the other does not occur. Therefore, the sliding component manufactured by the manufacturing method described above is easy to take out from the mold, and the problem of separation of the slider from the case is less likely to occur.

In some implementations the sliding component includes a plurality of sets of the penetrating portion and the protruding portion. Since the sliding component includes a plurality of such sets, when taking out the sliding component from the mold, the problem of separation of the case and the slider constituting the sliding component is less likely to occur.

In the above-described sliding component, the penetrating portion may have a receiving portion in which a penetrating region is enlarged in a shape corresponding to the protruding portion, and where sliding in the first direction may be restricted by contact of a portion of the protruding portion located inside the receiving portion with the case. In a state where sliding in the first direction is restricted, a part of the protruding portion 21 fit inside the receiving portion 12. Therefore, the relative positional shift between the case and the slider rarely occurs. Therefore, in the operation of the sliding component, when sliding is completed and operation stops by contact of the protruding portion with the case, rattling is less likely to occur in the sliding component that is stopped.

DETAILED DESCRIPTION OF THE DRAWINGS

Figure 1:
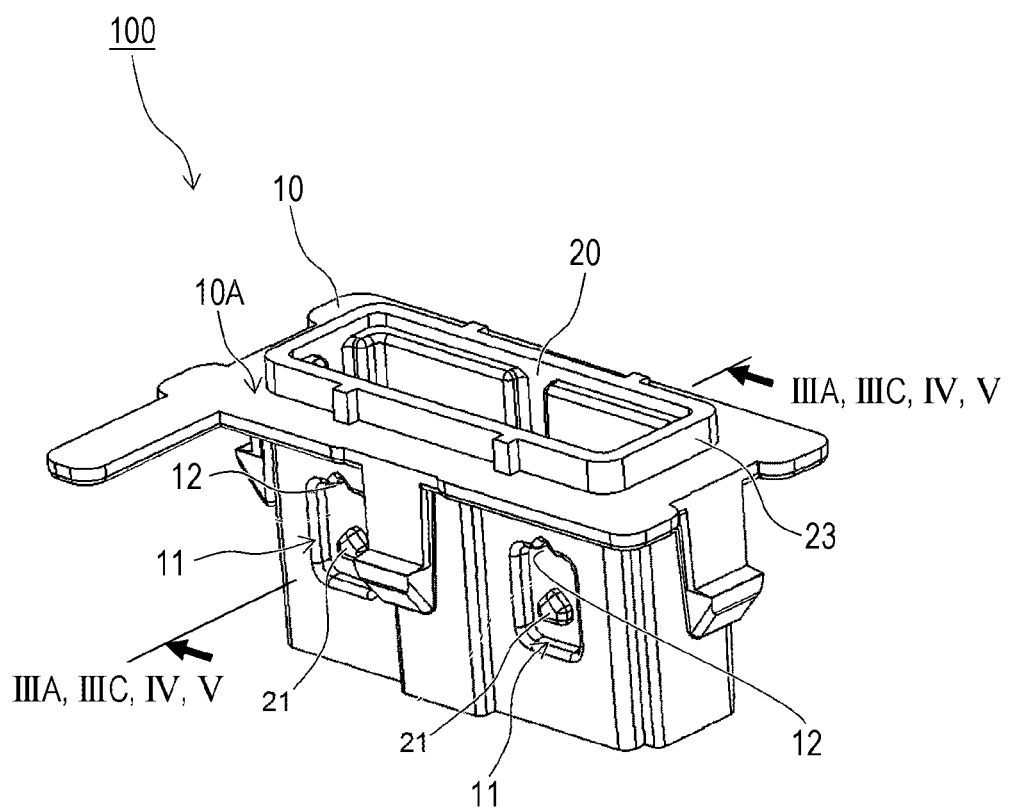
FIG. 1 is an external view for explaining a sliding component.
Figure 1:
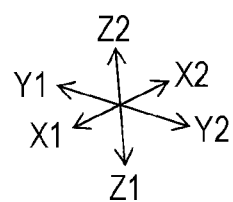
Figure 2A:
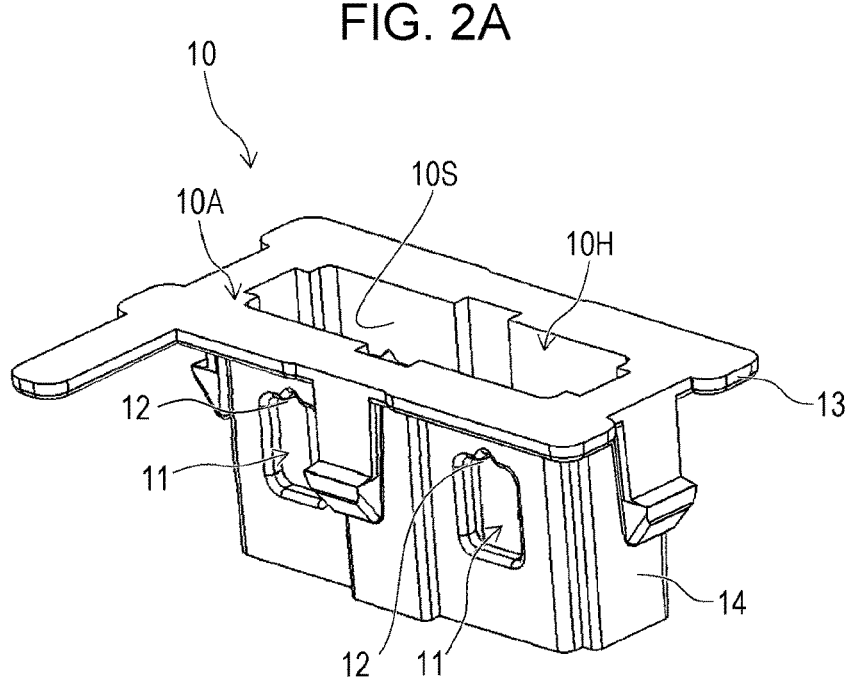
FIG. 2A is an external view showing a case constituting the sliding component shown in FIG. 1.

Hereinafter, embodiments and implementations of the present disclosure will be described with reference to the drawings. FIG. 1 is an external view for explaining a sliding component. FIG. 2A is an external view showing a case constituting the sliding component shown in FIG. 1, and FIG. 2B is an external view showing a slider constituting the sliding component shown in FIG. 1.

Figure 2B:
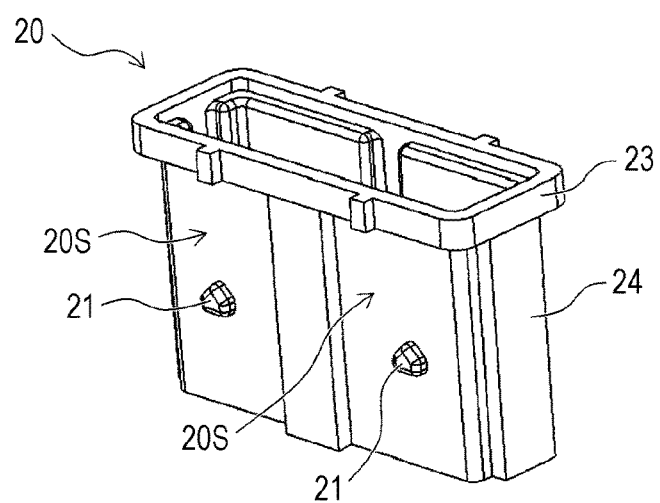
FIG. 2B is an external view showing a slider constituting the sliding component shown in FIG. 1.
Figure 2B:
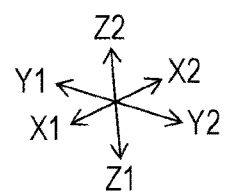

As shown in FIGS. 1 to 2B, the sliding component 100 is composed of a case 10 and a slider 20. The case 10 includes a case body portion (wall portion) 14 having such a tubular shape that a substantially rectangular frame body extends in the Z1-Z2 direction, and a case flange portion 13 that is located at a Z2 side end portion in the Z1-Z2 direction of the case body portion (wall portion) 14 and protrudes in the X-Y in-plane direction. The case 10 has a hollow portion 10H penetrating in the Z1-Z2 direction. The inner surface (X-Z surface and Y-Z surface) 10S of the case body portion (wall portion) 14 surrounding the hollow portion 10H is a sliding surface with the slider 20, and the Z1-Z2 direction, which is the penetration direction of the hollow portion 10H, is the sliding direction (first direction).

In a part of the case body portion (wall portion) 14 of the case 10, specifically in a part of the Y-Z surface, a penetrating portion 11 is provided in a direction different from the first direction (Z1-Z2 direction), specifically in the X1-X2 direction (second direction). In the field of view of FIGS. 1 and 2A, two penetrating portions 11 are arranged in the Y1-Y2 direction, and the case 10 has two more penetrating portions 11 opposed to the penetrating portions 11 in the X1-X2 direction. Each penetrating portion 11 has, in the Z2 side edge portion thereof in the Z1-Z2 direction, a receiving portion 12 composed of a portion where the case body portion (wall portion) 14 is cut out so as to have a shape corresponding to the shape of a protruding portion 21 to be described later and the penetrating region is enlarged.

The slider 20 includes a slider body portion 24 having such a tubular shape that a substantially rectangular frame body extends in the Z1-Z2 direction, and a slider flange portion 23 that is located at the Z2 side end portion in the Z1-Z2 direction of the slider body portion 24 and protrudes in the X-Y in-plane direction. The slider body portion 24, which is a part of the slider 20, is located inside the hollow portion 10H of the case 10, and the slider flange portion 23 is located outside the hollow portion 10H of the case 10. When the sliding component 100 is placed with the Z1 side in the Z1-Z2 direction facing downward, a surface of the slider flange portion 23 on the Z1 side in the Z1-Z2 direction comes into contact with a surface 10A of the case flange portion 13 on the Z2 side in the Z1-Z2 direction, so that the slider 20 is locked to the case 10.

The outer surface (X-Z surface and Y-Z surface) 20S of the slider body portion 24 is disposed so as to face the inner surface 10S of the case body portion (wall portion) 14 of the case 10 inside the hollow portion 10H of the case 10, and serves as a sliding surface with the case 10. Portions of the outer surface 20S of the slider body portion 24 of the slider body 20 that face the penetrating portions 11 of the case 10 are provided with protruding portions 21 protruding into the penetrating portions 11, specifically in the X1-X2 direction (second direction). Since the case 10 has four penetrating portions 11 as described above, the slider 20 has four protruding portions 21 corresponding thereto.

The protruding portions 21 each have a protrusion on the Z2 side in the Z1-Z2 direction, and corresponding to this protrusion, the shape of the receiving portions 12 when seen from the X1-X2 direction is a substantially triangular shape. The shape of the protruding portions 21 and the shape of the penetrating portions 11 are formed such that when the slider 20 is slid to the Z2 side in the first direction (Z1-Z2 direction) with respect to the case 10, parts of the protruding portions 21 fit in the receiving portions 12 of the protruding portions 11, the parts of the protruding portions 21 come into contact with the case body portion (wall portion) 14 of the case 10, and further sliding is restricted.

As described above, in the sliding component 100, the sliding to the Z1 side in the Z1-Z2 direction (first direction)

is restricted by the engagement of the slider flange portion 23 with the case flange portion 13, and the sliding to the Z2 side in the Z1-Z2 direction (first direction) is restricted by the engagement of the protruding portions 21 with the case body portion (wall portion) 14 of the case 10. Therefore, the sliding component 100 has such a structure that the case 10 and the slider 20 are not separated unless an excessive load is applied.

In assembling the sliding component 100 having such a structure when the case 10 and the slider 20 are separated, the following operation is performed. First, the case 10 and the slider 20 are arranged such that the case 10 is located on the Z1 side in the Z1-Z2 direction (first direction) and the slider 20 is located on the Z2 side in the Z1-Z2 direction (first direction), and the slider 20 is inserted from the opening on the Z2 side in the Z1-Z2 direction (first direction) of the hollow portion 10H of the case 10 to the Z1 side in the Z1-Z2 direction (first direction). When the protruding portions 21 come into contact with the case 10 during the insertion, the slider body portion 24 is pushed in the X1-X2 direction to be elastically deformed, the length of the slider body portion 24 in the X1-X2 direction is temporarily shortened, the protruding portions 21 are brought into contact with the inner surface 10S of the case body portion (wall portion) 14 of the case 10, and from that state, the slider 20 is further inserted to the Z1 side in the Z1-Z2 direction (first direction). When the protruding portions 21 reach the penetrating portions 11 of the case body portion (wall portion) 14 of the case 10, the protruding portions 21 are located within the penetrating portions 11 by the elastic recovery force of the slider body portion 24. In this way, the case 10 and the slider 20 are assembled to obtain the sliding component 100.

In such an operation, since the slider 20 is inserted into the case 10 while elastically deforming the slider body portion 24, there is a possibility that the slider 20 and the case 10 are damaged. However, as described below, methods for manufacturing the sliding component 100 according to forms of the present disclosure do not require such assembly work involving elastic deformation of the slider body portion 24. When the case 10 and the slider 20 are molded in a mold using a two-color molding technique, they are also assembled. Therefore, it is possible to obtain the sliding component 100 in which the case 10 and the slider 20 are assembled at the stage of taking out the molded product from the mold. Therefore, according to forms of the manufacturing method of this implementation, it is possible to efficiently manufacture the sliding component 100.

Since forms of the manufacturing method use a two-color molding technique, it includes a case molding step of molding the case and a slider molding step of molding the slider.

Figure 3A:
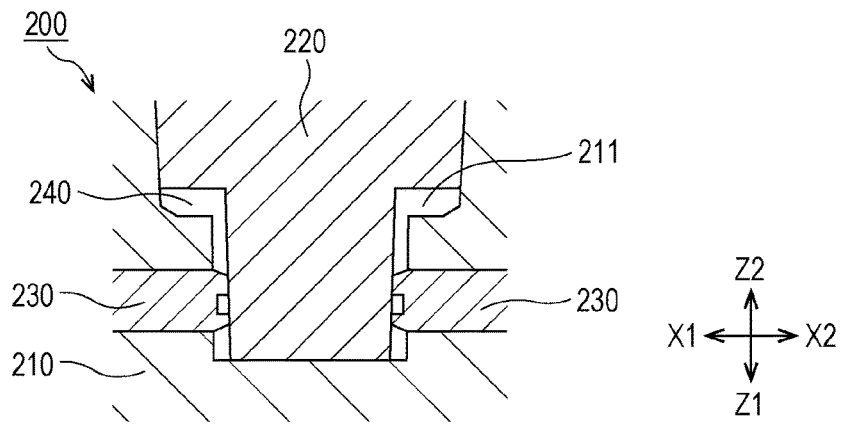
FIG. 3A is a cross-sectional view conceptually showing the structure of a mold at the time of performing the case molding step.

FIGS. 3A to 5C are views illustrating a method for manufacturing the sliding component 100. FIG. 3A is a cross-sectional view conceptually showing a structure of a mold at the time of performing the case molding step, FIG. 3B is a partial external view for explaining a structure of an insert, and FIG. 3C is a cross-sectional view conceptually showing a state where a first resin material is injected into a cavity in the case molding step. FIG. 4A is a cross-sectional view conceptually showing a state where the case molding step is completed, FIG. 4B is a cross-sectional view conceptually showing the structure of a mold at the time of performing the slider molding step, and FIG. 4C is a cross-sectional view conceptually showing a state where a second resin material is injected into a cavity in the slider molding step. Cross-sectional views shown in FIGS. 3A to 5C, such as FIG. 3A, are all schematic views of the cross-section of the sliding component 100 taken along line IIIA, IIIC, IV, V-IIIA, IIIC, IV, V of FIG. 1 or the cross-section of the mold at the position corresponding thereto.

Figure 3B:
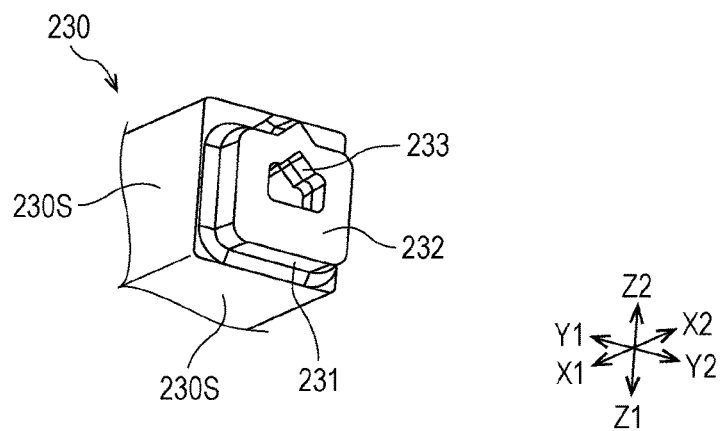
FIG. 3B is a partial external view for explaining the structure of an insert.
Figure 3C:
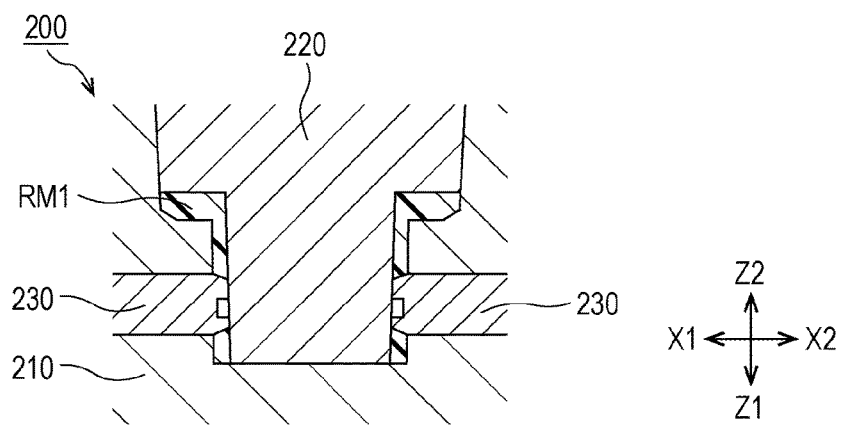
FIG. 3C is a cross-sectional view conceptually showing a state where a first resin material is injected into a cavity in the case molding step.

First, as shown in FIG. 3A, in a mold 200, a second mold 220 comes into contact with the surface on the Z1 side in the Z1-Z2 direction of a recess 211 of a first mold 210, so that a first cavity 240 is formed. Here, the first mold 210 has inserts 230 capable of advancing and retreating in the X1-X2 direction (a direction corresponding to the second direction of the sliding component 100). As shown in FIG. 3B, the inserts 230 are members that have sliding surfaces 230S and are slidable with respect to the first mold 210. When the inserts 230 are advanced to the inside of the first cavity 240, insert protruding portions 231 are located inside the first cavity 240, and first insert surfaces 232 that are surfaces on the advancing side (the X2 side in the X1-X2 direction in FIG. 3B) of the inserts 230 come into contact with the second mold 220, so that the first insert surfaces 232 are not exposed to the inside of the first cavity 240. Therefore, in this state, when a first resin material RM1 that is a resin material for forming the case 10 is injected into the first cavity 240 of the mold 200, as shown in FIG. 3C, the first resin material RM1 cannot be present in the parts of the insert protruding portions 231. Therefore, although the first insert surfaces 232 of the inserts 230 are provided with insert recesses 233 depressed to the X1 side in the X1-X2 direction as shown in FIG. 3B, the first resin material RM1 is not filled in the insert recesses 233. Therefore, as shown in FIG. 4A, in the case body portion (wall portion) 14 of the case 10 obtained by cooling and solidifying the first resin material RM1 filled in the first cavity 240, cutouts are formed, which become the penetrating portions 11.

A material that can satisfy the mechanical characteristics (strength, sliding property, etc.) required for the case 10 and has a higher melting temperature and a lower thermal expansion coefficient than those of a second resin material RM2 described later is selected as the material constituting the first resin material RM1. Polycarbonate is exemplified as such a material. From the viewpoint of appropriately forming the sliding surface between the case 10 and the slider 20, the first resin material RM1 is preferably a material having low compatibility with the second resin material RM2, and more preferably a material having incompatibility therewith. The first resin material RM1 may contain a filler.

Figure 4A:
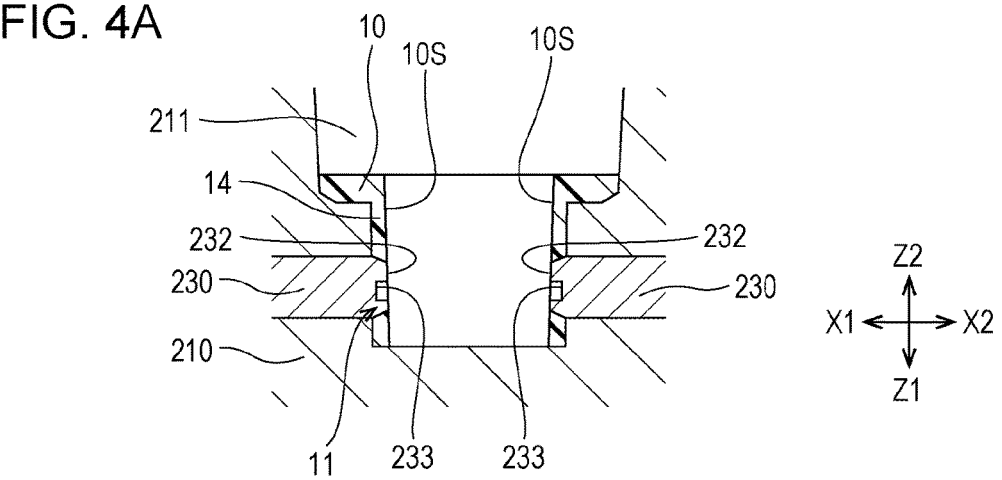
FIG. 4A is a cross-sectional view conceptually showing a state where the case molding step is completed.

When the case molding step is completed and the second mold 220 is separated from the first mold 210 to the Z2 side in the Z1-Z2 direction, as shown in FIG. 4A, the case 10 is located in the recess 211 of the first mold 210. Since the inserts 230 are advanced to the inside of the recess 211 of the first mold 210, the inner face 10S of the case body portion (wall portion) 14 of the case 10 and the first insert surfaces 232 are exposed to the inside of the recess 211 of the first mold 210. Since the first insert surfaces 232 are exposed, the insert recesses 233 are also exposed to the inside of the recess 211 of the first mold 210.

Figure 5A:
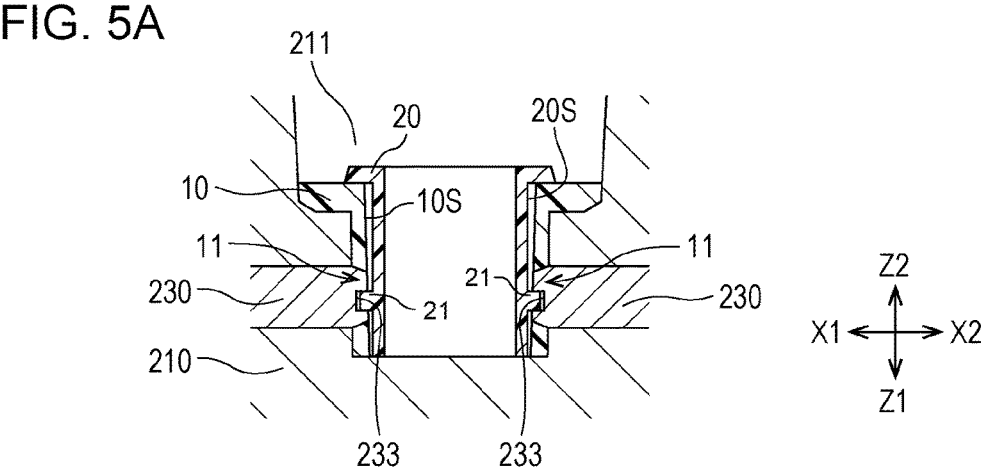
FIG. 5A is a cross-sectional view conceptually showing a state where cooling and solidification of the second resin material are completed in the slider molding step.
Figure 5B:
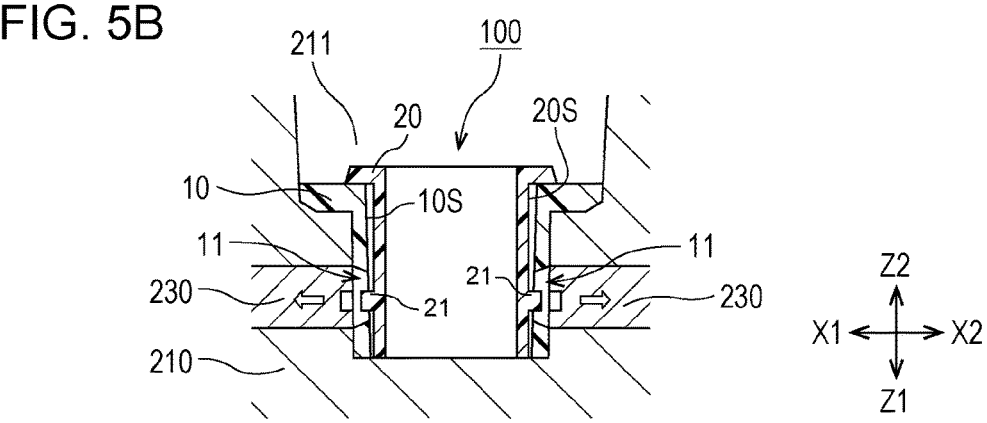
FIG. 5B is a cross-sectional view conceptually showing a state where the inserts are retreated after the slider molding step is completed.
Figure 5C:
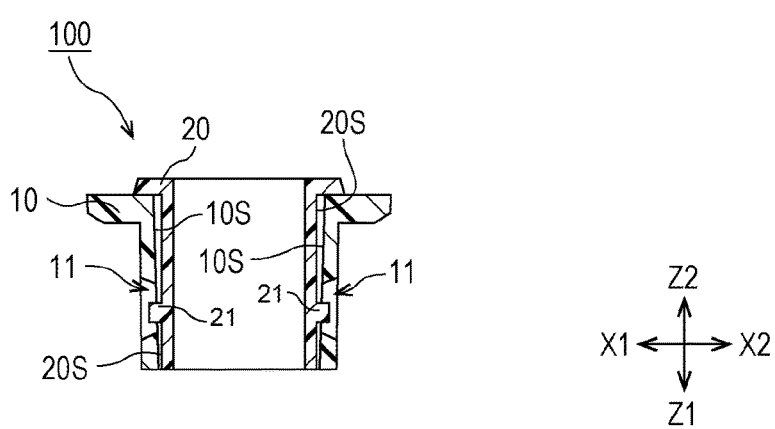
FIG. 5C is a schematic sectional view of the sliding component taken out from the mold.

In this state, the next slider molding step is performed. FIG. 5A is a cross-sectional view conceptually showing a state where cooling and solidification of the second resin material are completed in the slider molding step, FIG. 5B is a cross-sectional view conceptually showing a state where the inserts are retreated after the slider molding step is completed, and FIG. 5C is a schematic sectional view of the sliding component taken out from the mold.

Figure 4B:
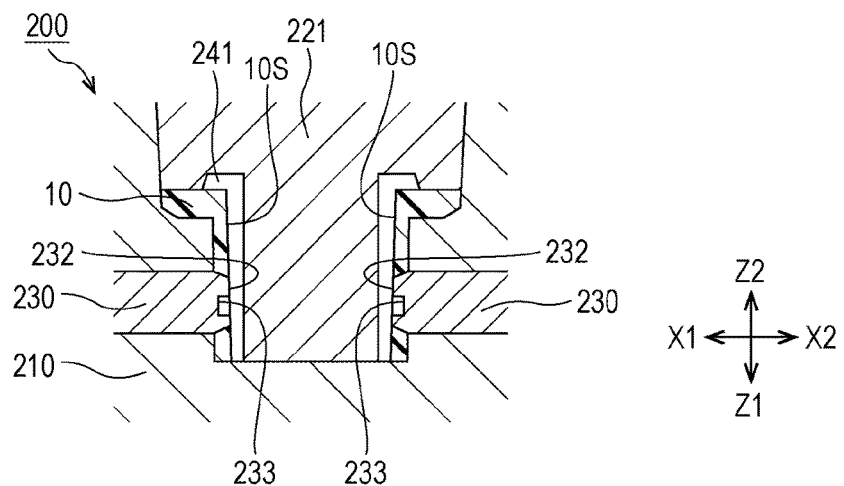
FIG. 4B is a cross-sectional view conceptually showing the structure of a mold at the time of performing the slider molding step.

In the slider molding step, in a state where the case 10 is present inside the mold 200 (specifically, inside the recess 211 of the first mold 210), a second resin material RM2 having a thermal expansion coefficient higher than that of the first resin material RM1 is injected into a space (second cavity 241) defined to include the inner surface 10S of the case body portion (wall portion) 14 of the case 10, and is cooled and solidified. Specifically, first, from the state shown in FIG. 4A, instead of the second mold 220, a third mold 221 is brought into contact with the surface on the Z1 side in the Z1-Z2 direction of the recess 211 of the first mold in the same manner as in the case of the second mold 220. As a result, as shown in FIG. 4B, a second cavity 241 is formed that is a space formed by the inner surface 10S of the case body portion (wall portion) 14 of the case 10, the first insert surfaces 232 with the insert recesses 233 exposed, the surface of the first mold 210, and the surface of the third mold 221.

Figure 4C:
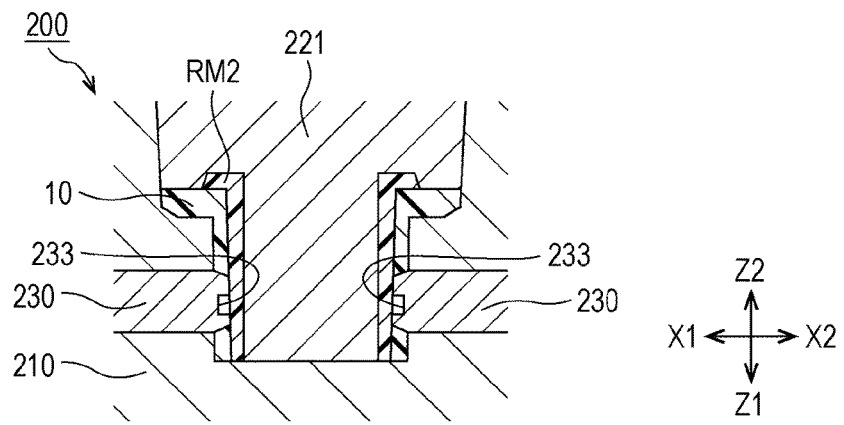
FIG. 4C is a cross-sectional view conceptually showing a state where a second resin material is injected into a cavity in the slider molding step.

Then, the second resin material RM2 is injected and filled into the second cavity 241. As a result, as shown in FIG. 4C, the insides of the insert recesses 233 are also filled with the second resin material RM2.

A material that can satisfy the mechanical characteristics (strength, sliding property, etc.) required for the slider 20 and has a lower melting temperature and a higher thermal expansion coefficient than those of the first resin material RM1 described above is selected as the material constituting the second resin material RM2. Polyacetal is exemplified as such a material. From the viewpoint of appropriately forming the sliding surface between the case 10 and the slider 20, the first resin material RM1 is preferably a material having low compatibility with the second resin material RM2, and more preferably a material having incompatibility therewith. Polycarbonate, which is exemplified as the first resin material RM1, has a melting temperature of about 260° C. and a thermal expansion coefficient of about 1%. On the other hand, polyacetal, which is exemplified as the second resin material RM2, has a melting temperature of about 200'C and a thermal expansion coefficient of about 2%. The second resin material RM2 may contain a filler.

Since materials that satisfy the above conditions are selected as the first resin material RM1 and the second resin material RM2, the inner surface 10S of the case body portion (wall portion) 14 of the case 10, which constitutes a part of the second cavity 241, does not melt and does not mix with the second resin material RM2 in the slider molding step. Therefore, when the second resin material RM2 filled in the second cavity 241 is cooled and solidified, the slider 20 is formed separately from the case 10. Therefore, when the slider molding step is completed and the third mold 221 is separated from the first mold 210 to the Z2 side in the Z1-Z2 direction, as shown in FIG. 5A, the slider 20 is arranged inside the recess 211 of the first mold 210 such that the outer surface 20S faces the inner surface 10S of the case body portion (wall portion) 14 of the case 10 with a space therebetween. At this time, the protruding portions 21 are arranged so as to protrude into the penetrating portions 11 of the case 10 although the inserts 230 are located therebetween.

As shown in FIG. 5B, when the inserts 230 are retreated (the retreating direction is indicated by white arrows in FIG. 5B), the slide member 100 consisting of the case 10 and the slider 20 is formed inside the recess 211 of the first mold 210 in a state where the protruding portions 21 of the slider 20 are fitted in the penetrating portions 11 of the case 10. Therefore, if one of the case 10 and the slider 20 located inside the recess 211 of the first mold 210 is lifted, the sliding component 100 shown in FIG. 5C can be taken out from the first mold 210.

As described above, according to forms of the manufacturing method, the sliding component 100 in which the slider 20 is fitted in the case 10 can be manufactured by molding the case 10 and the slider 20 in a mold by a two-color molding technique without assembling the case 10 and the slider 20 separately.

Although implementations and application examples thereof have been described above, the present disclosure is not limited to these examples. For example, those obtained by appropriate addition of components, deletion, or change in design of the above-described embodiments and implementations by those skilled in the art and those obtained by appropriate combinations of features of the embodiments and implementations are also included in the scope of the present disclosure.

Although the above-described sliding component 100 has a plurality of sets of the penetrating portion 11 and the protruding portion 21, the present disclosure is not limited to this. There may be one set of the penetrating portion 11 and the protruding portion 21. When there is a plurality of sets, since the possibility of separating the case 10 and the slider 20 constituting the sliding component 100 is reduced, it is preferable.

Although the penetrating portions 11 of the above-described sliding component 100 have the receiving portions 12, the present disclosure is not limited to this. When the penetrating portions 11 have the receiving portions 12, in a state where sliding in the first direction (Z1-Z2 direction) is restricted, parts of the protruding portions 21 fit inside the receiving portions 12. Therefore, the relative positional shift between the case 10 and the slider 20 rarely occur. Therefore, in the operation of the sliding component 100, when sliding is completed and operation stops by contact of the protruding portions 21 with the case 10 (the case body portion (wall portion) 14), this is preferable because rattling is less likely to occur in the sliding component 100 that is stopped.

The third mold 221 may be formed by moving the inserts of the second mold 220. In this case, by moving the inserts without going through the step of FIG. 4A, the state of FIG. 4B can be reached.

The sliding component 100 may consist of three or more members. For example, a plurality of sliders may be fitted into one case. Even in such a case, as in forms of the above-described manufacturing method, by forming the penetrating portion and the protruding portion located inside the penetrating portions in a state where one insert is advanced and then retreating the insert, a structure in which the protruding portion is fitted in the penetrating portion can be obtained.

It is therefore intended that the foregoing detailed description be regarded as illustrative rather than limiting, and that it be understood that it is the following claims, including all equivalents, that are intended to define the spirit and scope of this disclosure.

What is claimed is:

1. A method for manufacturing a sliding component including a case having a hollow portion and a slider, a part of which is located in the hollow portion, an inner surface of a wall portion surrounding the hollow portion of the case and an outer surface of a portion of the slider located in the hollow portion facing each other and slidable in a first direction, the wall portion of the case being provided with a penetrating portion penetrating in a second direction different from the first direction, a portion of an outer surface of the slider facing the penetrating portion being provided with a protruding portion protruding into the penetrating portion, the shape of the protruding portion and the shape of the penetrating portion being formed such that sliding of the slider in the first direction with respect to the case is restricted by contact of the protruding portion with the case, the method for manufacturing comprising:

a case molding step of injecting a first resin material into a first cavity of a mold having an insert and cooling and solidifying the first resin material to form the case in the mold; and a slider molding step of, in a state where the case formed in the case molding step is present in the mold, injecting a second resin material having a higher thermal expansion coefficient than that of the first resin material into a second cavity defined to include the inner surface of the wall portion of the case and cooling and solidifying the second resin material to form the slider separate from the case, wherein the insert is movable in a direction corresponding to the second direction, and the insert has a recess corresponding to the protruding portion of the slider in a first insert surface located on the advancing side of the insert, wherein, in the case molding step, the first resin material is injected to form the penetration portion in a state where the insert is advanced and the first insert surface is not exposed in the first cavity, wherein, in the slider molding step, the second resin material is injected in a state where the first insert surface is exposed in the second cavity, and the second resin material is filled in the recess to form the protruding portion, and wherein, after completion of the slider molding step, the insert is retreated, and the sliding component in which the slider is fitted in the case is formed in the mold such that the protruding portion of the slider is positioned within the penetrating portion of the case.

2. The method for manufacturing a sliding component according to claim 1, comprising a plurality of sets of the penetrating portion and the protruding portion.

3. The method for manufacturing a sliding component according to claim 1, wherein the penetrating portion has a receiving portion in which a penetrating region is enlarged in a shape corresponding to the protruding portion, and wherein sliding in the first direction is restricted by contact of a portion of the protruding portion located inside the receiving portion with the case.

* * * * *